US012140910B2

(12) United States Patent
Olwal

(10) Patent No.: US 12,140,910 B2
(45) Date of Patent: *Nov. 12, 2024

(54) SYMBIOTIC SMARTWATCH DISPLAYS

(71) Applicant: Google LLC, Mountain View, CA (US)

(72) Inventor: Alex Olwal, San Francisco, CA (US)

(73) Assignee: Google LLC, Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/959,548

(22) Filed: Oct. 4, 2022

(65) Prior Publication Data

US 2023/0028986 A1    Jan. 26, 2023

Related U.S. Application Data

(63) Continuation of application No. 16/541,532, filed on Aug. 15, 2019, now Pat. No. 11,487,249.

(60) Provisional application No. 62/739,479, filed on Oct. 1, 2018.

(51) Int. Cl.
*G04C 17/00* (2006.01)
*G04C 3/00* (2006.01)
*G04G 9/00* (2006.01)
*G06F 1/16* (2006.01)

(52) U.S. Cl.
CPC ......... *G04C 17/0091* (2013.01); *G04C 3/001* (2013.01); *G04G 9/0094* (2013.01); *G06F 1/163* (2013.01)

(58) Field of Classification Search
CPC .. G04G 21/025; G04G 17/045; G04G 9/0064; G04G 9/0094; G04G 21/08; G04G 21/04; G04G 9/04; G04G 9/08; G04G 9/082; G04C 3/001; G04C 17/0091; G04C 17/009; G06F 1/163; G04B 19/04
See application file for complete search history.

(56) References Cited

U.S. PATENT DOCUMENTS

| | | |
|---|---|---|
| 4,488,818 A | 12/1984 | Saurer et al. |
| 5,528,559 A | 6/1996 | Lucas |
| 5,740,130 A | 4/1998 | Grupp et al. |
| 11,487,249 B2 * | 11/2022 | Olwal ............... G04C 3/001 |
| 2004/0145971 A1 | 7/2004 | Lau |
| 2007/0274161 A1 | 11/2007 | Rydgren |
| 2008/0151700 A1 * | 6/2008 | Inoue .............. G01D 7/002 |
| | | 116/284 |
| 2015/0301506 A1 | 10/2015 | Koumaiha |

(Continued)

*Primary Examiner* — Edwin A. Leon
(74) *Attorney, Agent, or Firm* — Lerner David LLP

(57) ABSTRACT

Aspects of the technology provide a symbiotic graphical display on a client device such as a smartwatch. The system includes at least one emissive display element and at least one non-emissive display element. The display elements are arrayed in layers or other configurations such that content or other information is concurrently aligned across the respective display surfaces of the different elements. A first set of content is rendered using the non-emissive display element while a second set of content is rendered using the emissive display element. Depending on characteristics or features of a given content item, that item may be rendered by one or both of the display elements. Certain content may be transitioned from the emissive display element to the non-emissive display element according to a time threshold or other criteria.

20 Claims, 9 Drawing Sheets

(56) References Cited

U.S. PATENT DOCUMENTS

2016/0306328 A1 10/2016 Ko et al.
2020/0249632 A1* 8/2020 Olwal .................... G06F 1/163

* cited by examiner

300

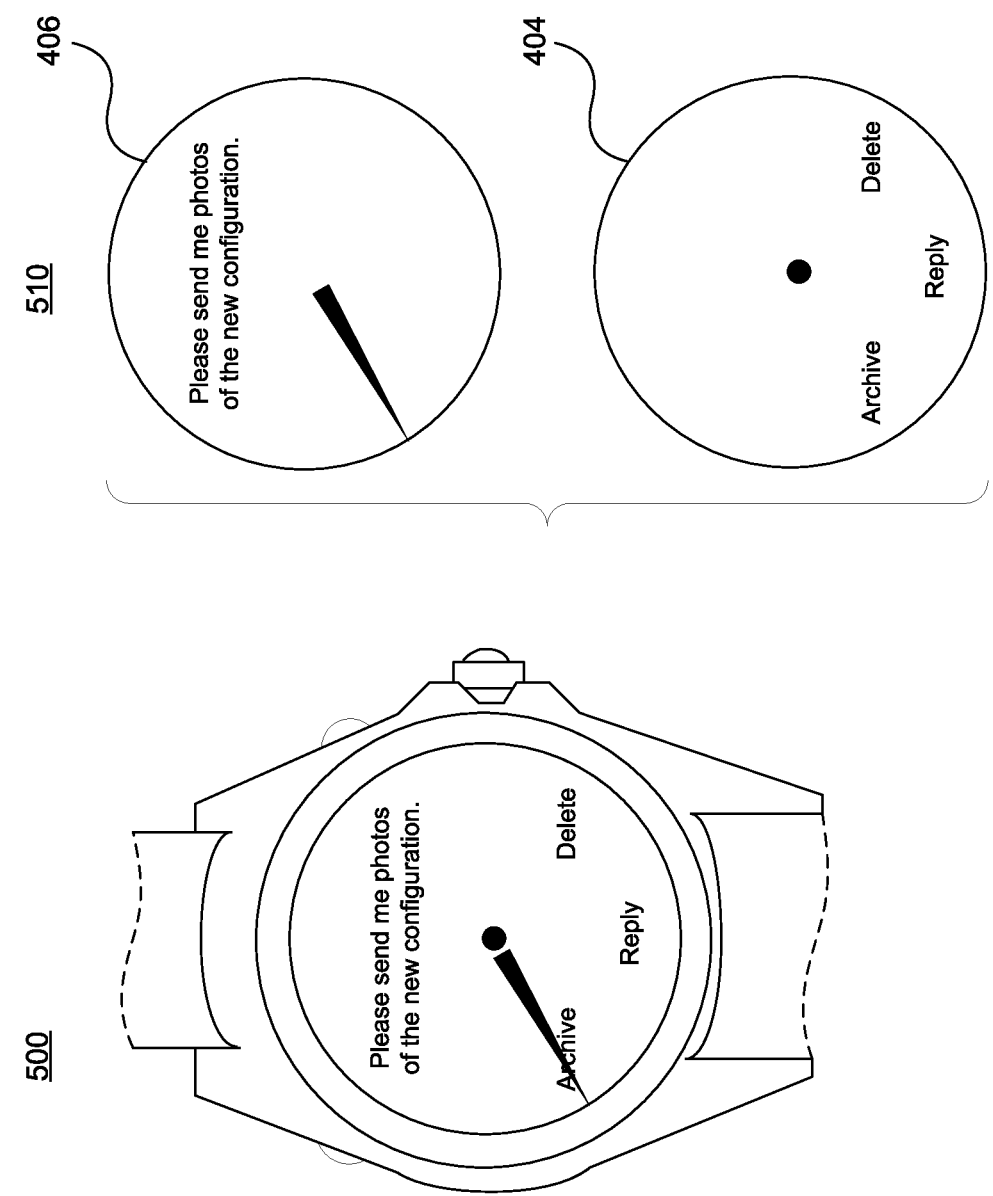
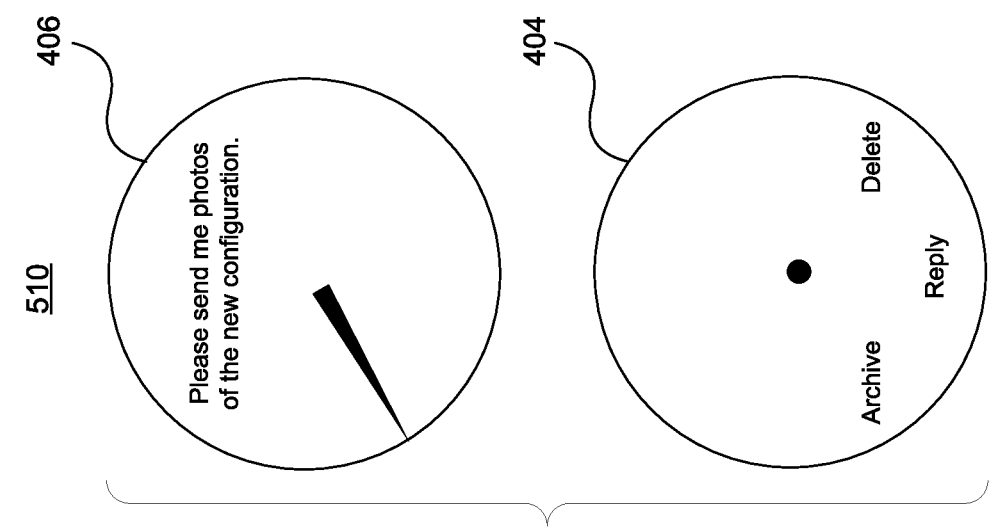
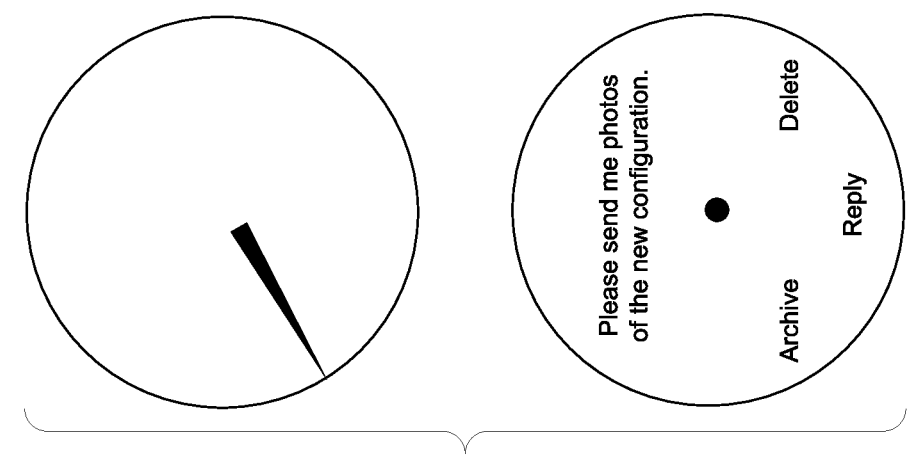
Fig. 5A 500
Fig. 5B 510 406 404
Fig. 5C 520

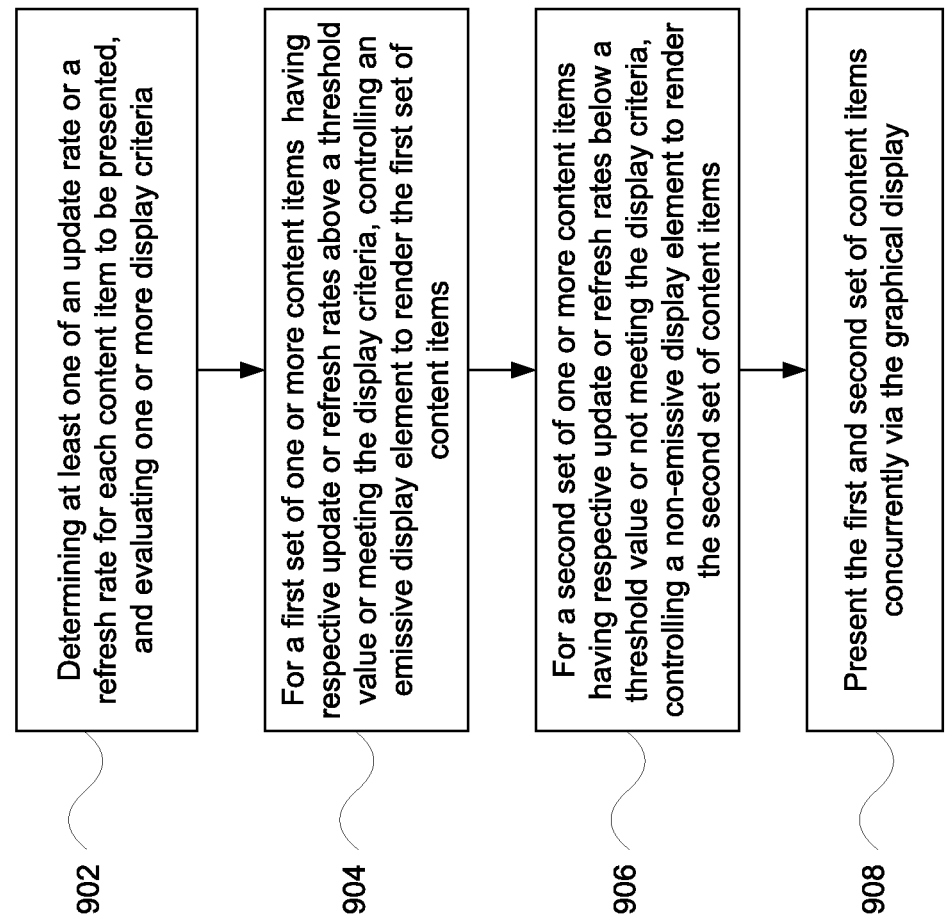

SYMBIOTIC SMARTWATCH DISPLAYS

CROSS-REFERENCE TO RELATED APPLICATIONS

The present application is a continuation of U.S. patent application Ser. No. 16/541,532, filed on Aug. 15, 2019, which claims the benefit of the filing date of U.S. Provisional Patent Application No. 62/739,479, filed Oct. 1, 2018, the disclosures of which are hereby incorporated herein by reference.

BACKGROUND

Personal information technology has rapidly evolved with the introduction of smartphones. Smartphones are nearly ubiquitous, but are being supplemented and in some instance replaced by other electronics. Wearable devices with smaller form factors have more recently been used to provide users with activity information, notifications and other functionality in a user-friendly manner One type of wearable device that is becoming more and more popular is the smartwatch. In addition to telling time, smartwatches may run various apps and or perform in a manner similar to a smartphone. Thus, smartwatches can address the smartphone size issue, and may provide relevant information to a user in a more discreet manner than a smartphone.

BRIEF SUMMARY

Smartwatches may employ emissive displays, non-emissive displays, and in some situations both emissive and non-emissive displays. Both types of displays have different benefits and limitations.

Emissive displays are useful because they are able to provide high-resolution, full-color imagery at video frame rates, and do not require another light source for readability. However, existing light emitting displays may not effectively handle daylight visibility or otherwise provide sufficient contrast under certain conditions. Unnecessarily bright displays in a dimly lit place, such as a movie theater, can be distracting to the wearer and others nearby. The emitted light can cause eye strain with extended wearer interactions. In addition, emissive displays are power hungry, using battery power just by being turned on.

In contrast, non-emissive displays are able to provide excellent readability in bright environments (e.g., outdoors), with high contrast and reduced eye strain relative to emissive displays. Unfortunately, non-emissive displays typically have a limited refresh rate and color depth. These limitations can make them unsuitable for interactive apps and video.

Given the relative strengths and weaknesses of emissive and non-emissive displays, certain approaches attempt to employ both types of displays in the same device with layered transparent displays. However, such approaches treat each display, or layer, independently of the other. Thus, whether an emissive or a non-emissive display is active may be based on the use case. This can result in unnecessary power consumption, poor readability and other issues when content has different aspects that are not well-suited to one particular type of display.

Rather than having to compromise what qualities to prioritize, the present technology combines the advantageous features of emissive and non-emissive displays through a symbiotic display architecture. This is done in a way that leverages the strengths and efficiencies of the different display components. The result is a robust approach that provides beneficial content to the wearer, while saving power, reducing eye strain and minimizing distractions to others nearby.

According to one aspect of the technology, a smartwatch configured to present content to a wearer is provided. The smartwatch comprises a user interface subsystem including one or more actuator elements configured to receive input from the wearer, an emissive display element, a non-emissive display element and one or more processors. The emissive display element is disposed along a first area of a housing of the smartwatch. The emissive display element has a first set of render speeds or update rates (one or more render speeds and/or one or more update rates). The non-emissive display element is disposed along a second area of the housing of the smartwatch which is separate from the first area. The non-emissive display element has a second set of render speeds or update rates (one or more render speeds and/or one or more update rates) that are different from the first set of render speeds or update rates. The one or more processors are operatively coupled to the user interface subsystem, the emissive display element and the non-emissive display element. The one or more processors are configured to determine at least one of an update rate or a refresh rate for each of a plurality of content elements to be presented to the wearer and evaluate one or more display criteria including power consumption or visual quality. For a first set of one or more of the plurality of content elements having respective update rates or refresh rates above a threshold value or meeting at least one of the display criteria, the one or more processors are configured to control the emissive display element to render the first set for presentation to the wearer. And for a second set of one or more other ones of the plurality of content elements having respective update rates or refresh rates below the threshold value or not meeting at least one of the display criteria, the one or more processors are configured to control the non-emissive display element to render the second set for presentation to the wearer, so that the first and second sets of content elements are presented concurrently to the wearer.

In one example, the emissive display element comprises an organic light emitting diode (OLED) display device. In this example, the non-emissive display element may comprise either an electrophoretic display device or a liquid crystal display (LCD) device.

In one scenario, the first set of content elements includes inputted text or an animation. According to an example, in response to the user interface subsystem receiving input from the wearer, the one or more processors are configured to control the emissive display element to render the input received from the wearer.

In another example, the one or more processors are further configured to determine that a selected period of time has elapsed since the first set of content elements has been rendered by the emissive display element. In response to the determination that the selected period of time has elapsed, the one or more processors are able to control the emissive display element to cease render of the first set of content elements, and to control the non-emissive display element to render the first set of content elements. The one or more processors may be configured to control the non-emissive display element to render the first set of content elements along with the second set of content elements. And the selected period of time may be dependent upon a type of content of the first set of content elements.

In yet another example, the one or more processors are further configured to control the emissive display element to highlight a selected content element. The selected content element highlighted by the emissive display element may rendered by the non-emissive display element. The highlight may be performed by increasing a brightness, coloring, or shading a portion of the emissive display element.

Furthermore, the visual quality may include one or more of brightness, color, texture, artifacts and emission.

According to another aspect of the technology, a method of operating a graphical display of a client device is provided. The graphical display includes an emissive display element having a first set of render speeds or update rates and a non-emissive display element having a second set of render speeds or update rates different from the first set of render speeds or update rates. The method includes determining, by one or more processors of the client device, at least one of an update rate or a refresh rate for each of a plurality of content elements to be presented to a user; evaluating, by the one or more processors, one or more display criteria including power consumption or visual quality; for a first set of one or more of the plurality of content elements having respective update rates or refresh rates above a threshold value or meeting at least one of the display criteria, controlling the emissive display element to render the first set for presentation to the user; and for a second set of one or more other ones of the plurality of content elements having respective update rates or refresh rates below the threshold value or not meeting at least one of the display criteria, controlling the non-emissive display element to render the second set for presentation to the user, so that the first and second sets of content elements are presented concurrently via the graphical display.

In one example, the method further comprises receiving tactile or audible input from the user. In response to receiving the input, the one or more processors are further configured to control the emissive display element to render the received input received.

In another example, the method further includes determining that a selected period of time has elapsed since the first set of content elements has been rendered by the emissive display element. In response to the determination that the selected period of time has elapsed, the method also includes controlling the emissive display element to cease rendering the first set of content elements, and controlling the non-emissive display element to render the first set of content elements. Here, the method may also include controlling the non-emissive display element to render the first set of content elements along with the second set of content elements. The selected period of time may be dependent upon a type of content of the first set of content elements.

In another example, the method further comprises controlling the emissive display element to augment a selected content element. The selected content element augmented by the emissive display element may be rendered by the non-emissive display element. The augmenting may be performed by increasing a brightness, coloring, or shading a portion of the emissive display element. Alternatively, the augmenting includes replicating the selected content item with the emissive display element so that the emissive display element renders a complementary content item to be of a same size or shape as the selected content item. Here, the complementary content item is overlaid or offset from the selected content item to obtain a particular visual effect.

BRIEF DESCRIPTION OF THE DRAWINGS

FIGS. 5A-5C illustrates an example of content transition between display elements in accordance with aspects of the disclosure.

FIG. 9 is a flow diagram of a method of operating a symbiotic graphical display device in accordance with aspects of the disclosure.

DETAILED DESCRIPTION

Overview

The technology employs complimentary usage of two (or more) emissive and non-emissive display layers, such that the information is aligned across the display surfaces. This structural approach enables enhanced user interfaces, where in some examples selected content is rendered using the non-emissive display while other content is presented using the emissive layer.

Example System

Figure 1:
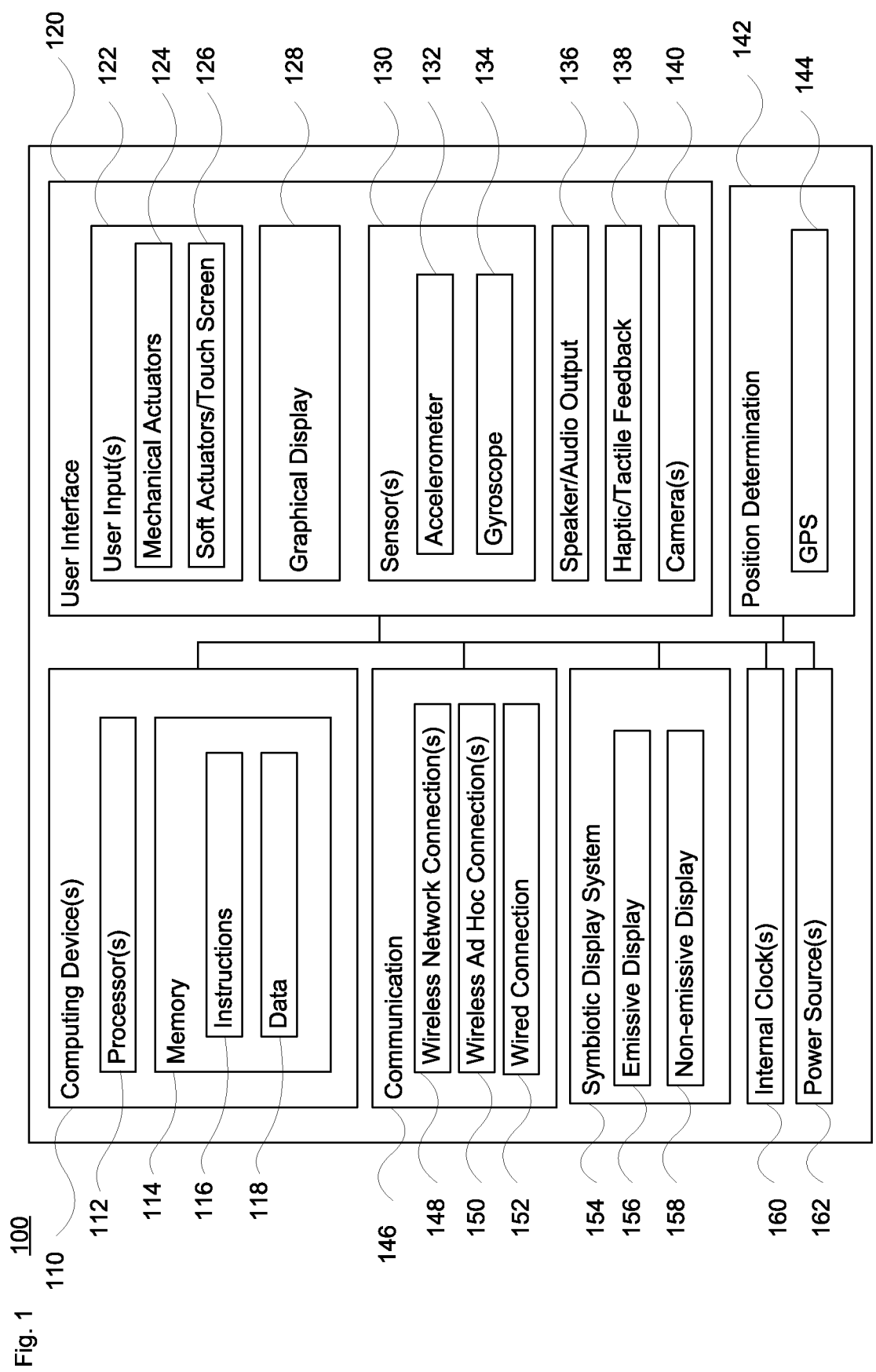
FIG. 1 is a functional diagram of an example symbiotic display smartwatch in accordance with aspects of the disclosure.

As shown in FIG. 1, a smartwatch 100 in accordance with aspects of the disclosure includes various components. The smartwatch 100 may have one or more computing devices, such as computing device 110 containing one or more processors 112, memory 114 and other components typically present in a smartphone or other personal computing device. The one or more processors 112 may be processors such as commercially available CPUs. Alternatively, the one or more processors may be a dedicated device such as an ASIC, a single or multi-core controller, or other hardware-based processor.

The memory 114 stores information accessible by the one or more processors 112, including instructions 116 and data 118 that may be executed or otherwise used by each processor 112. The memory 114 may be, e.g., a solid state memory or other type of non-transitory memory capable of storing information accessible by the processor(s), including write-capable and/or read-only memories.

The instructions 116 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in detail below.

The data 118 may be retrieved, stored or modified by processor 112 in accordance with the instructions 116. As an example, data 118 of memory 114 may store predefined scenarios. A given scenario may identify a set of scenario requirements including which display layer(s) will present selected content.

User interface 120 includes various I/O elements. For instance, one or more user inputs 122 such as mechanical actuators 124 and/or soft actuators 126 are provided. The mechanical actuators 124 may include a crown, buttons, switches and other components. The soft actuators 126 may be incorporated into a touchscreen cover, e.g., a resistive or capacitive touch screen. Also part of the user interface 120 is a graphical display 128. Content items to be presented by the graphical display 128 are generated via underlying emissive and non-emissive display layers, which are discussed in detail below.

Figure 2:
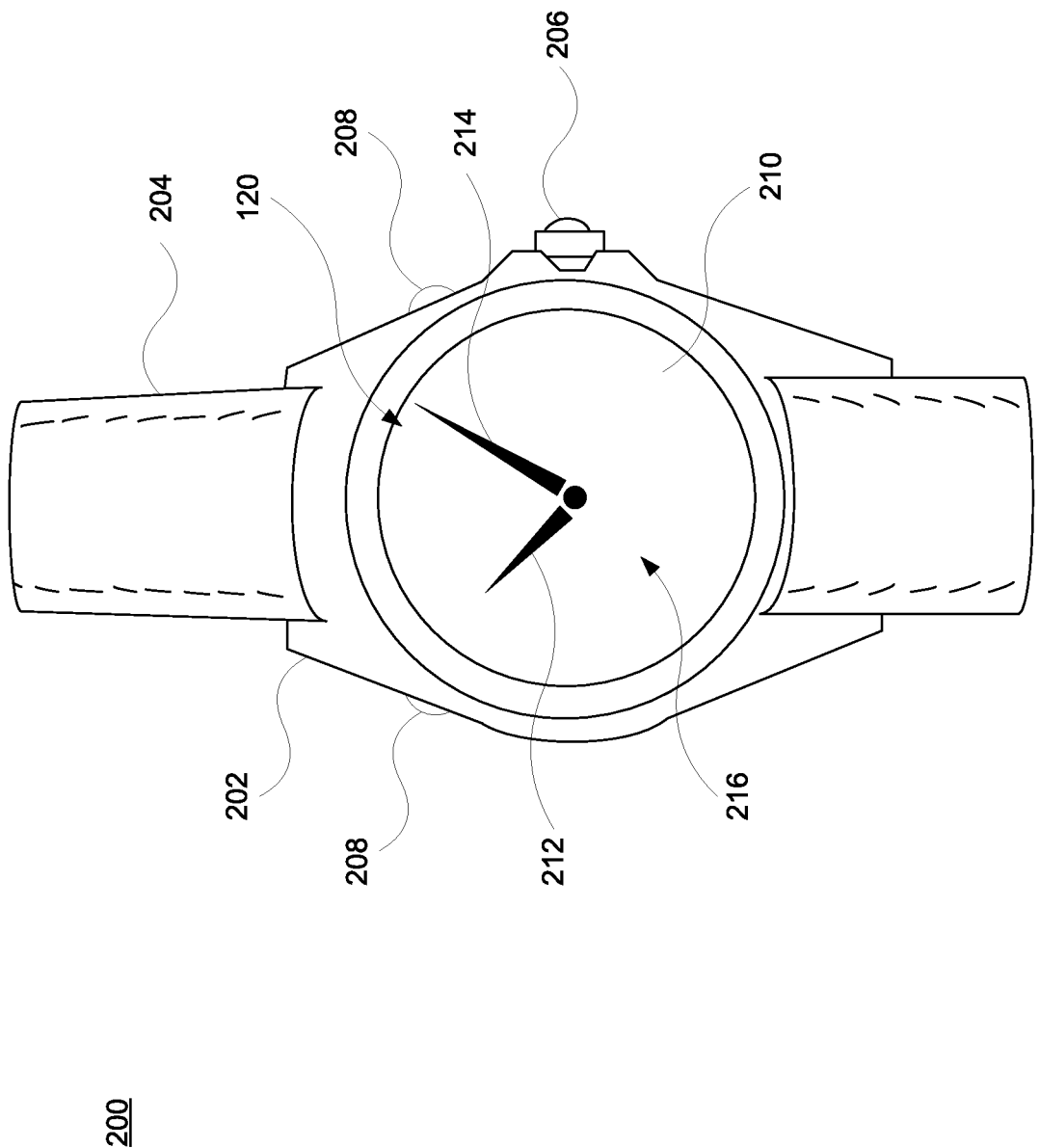
FIG. 2 illustrates an example smartwatch in accordance with aspects of the disclosure.

An example watch configuration 200 with such a user interface 120 is shown in FIG. 2. The example watch configuration 200 includes a watch housing 202 and a band 204 connected thereto. The mechanical actuators here include crown 206 and a pair of supplemental buttons 208. The number of mechanical actuators may vary, and may be more or less than the number shown. Actuators may be located on the band 204 in addition to or in place of actuators on the housing 202. In fact, in some instances there may be no mechanical actuators on the housing 202 or the band 204. One or more soft actuators may be incorporated into cover 210. An hour hand 212 and a minute hand 214 may be presented by the user interface 120. Depending on the watch functionality, one or more additional hand indicators, e.g., a seconds hand or an alarm hand, may also be presented. Or, alternatively, the watch style may dictate a watch having only one hand. In this example, the user interface 120 includes a circular graphical display 216. However, the graphical display 216 may have a different shape or size depending on the configuration of the watch housing 202. For instance, the graphical display 216 may be square, rectangular, octagonal or a different geometric shape.

Returning to FIG. 1, the user interface 120 may include additional components as well. By way of example, one or more sensors 130 may be located on or within the watch housing. The sensors may include an accelerometer 132, e.g., a 3-axis accelerometer, and/or a gyroscope 134. Other sensors may include a magnetometer, a barometric pressure sensor, an ambient temperature sensor, a skin temperature sensor, a heart rate monitor, an oximetry sensor to measure blood oxygen levels, and a galvanic skin response sensor to determine exertion levels. Additional or different sensors may also be employed.

The user interface 120 may also include one or more speakers, transducers or other audio outputs 136. A haptic interface or other tactile feedback 138 is used to provide non-visual and non-audible information to the wearer. And one or more cameras 140 can be included on the housing, band or incorporated into the display.

The smartwatch 100 also includes a position determination module 142, which may include a GPS subsystem 144 or other positioning system components. Information from the accelerometer 132, gyroscope 134 and/or from data received or determined from remote devices (e.g., wireless base stations or wireless access points), can be employed by the position determination module 142 to calculate or otherwise estimate the physical location of the smartwatch 100.

In order to obtain information from and send information to remote devices, the smartwatch 100 may include a communication subsystem 146 having a wireless network connection module 148, a wireless ad hoc connection module 150, and/or a wired connection module 152. While not shown, the communication subsystem 150 has a baseband section for processing data and a transceiver section for transmitting data to and receiving data from the remote devices. The transceiver may operate at RF frequencies via one or more antennae. The wireless network connection module 148 may be configured to support communication via cellular, LTE, 4G and other networked architectures. The wireless ad hoc connection module 150 may be configured to support Bluetooth®, Bluetooth LE, near field communications, and other non-networked wireless arrangements. And the wired connection 152 may include a USB, micro USB, USB type C or other connector, for example to receive data and/or power from a laptop, tablet, smartphone or other device.

Figure 3:
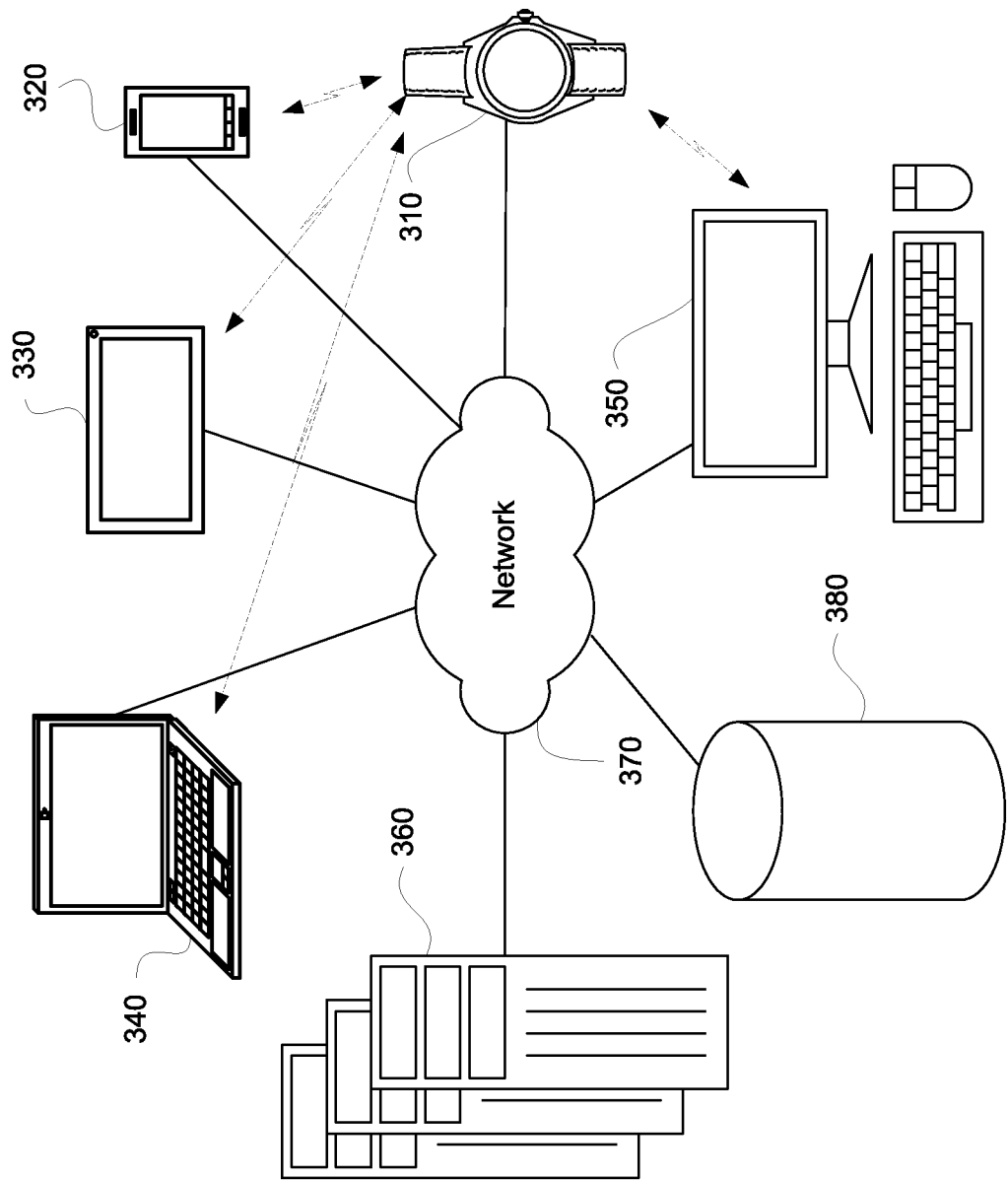
FIG. 3 is an example pictorial diagram of a networked or ad hoc system in accordance with aspects of the disclosure.

FIG. 3 is a pictorial diagram of an example system 300 that includes one or more smartwatches 310 or other wearable personal devices, as well as remote user devices such as smartphone 320, tablet computer 330, laptop computer 340, desktop PC 350 and a remote server system 360 connected via a network 370. System 300 may also include one or more databases 380, which may be operatively associated with the server system 360. Although only a few devices are depicted for simplicity, the system 300 may include significantly more. Each client device and the server system may include one or more processors, memory, data and instructions. Such processors, memories, data and instructions may be configured similarly to one or more processors, memory, data, and instructions of computing device 110. The smartwatch(es) 310 may also communicate directly with smartphone 320, tablet computer 330, laptop computer 340 and/or desktop PC 350, for instance via an ad-hoc arrangement or wired link, as shown by the dash-dot arrows. The smartwatch(es) may obtain data, instructions, apps or other information from any of the remote devices, and may use such information when communicating with the user via the user interface of the watch. For instance, an app on smartphone 320, tablet 330 or laptop 340 may provide information to or control what is presented to the user on the smartwatch 310. This can include email, calendar or other content.

Returning to FIG. 1, the smartwatch 100 also includes a symbiotic display system 154 that is configured to generate content for display to the user via the graphical display 128, as well as an internal clock(s) 160 and a power source(s) 162. One or more clocks provide timing information, which can be used for timekeeping, time measurement for apps and other programs run by the smartwatch, and basic operations by the computing device(s) 110, GPS 144 and communication subsystem 146. And one or more power sources 162 provide power to the various components of the smartwatch. The power source(s) 162 may include, e.g., a battery, winding mechanism, solar cell or combination thereof. The computing devices may be operatively couples to these and other subsystems and components via a wired bus or other link, including wireless links.

The symbiotic display system 154 includes an emissive display element 156 and a non-emissive display element 158. These display elements are configured to work together to generate different visualizations or other aspects of the displayed content. One example of the emissive display element 156 is a transparent organic light emitting diode (TOLED or transparent OLED) layer. Other exemplary emissive display elements include active matrix LEDs (AMOLED) and passive matrix LEDs (PMOLED), although other types of emissive display elements may also be employed. The emissive display element may be greyscale, multi-color or a full color display of, e.g., 6-bit, 8-bit or 16-bit resolution (or more).

The non-emissive display element 158 may be (but is not necessarily) bi-stable, which means that it does not require power to maintain the displayed information. In one example, the non-emissive display element may be an electronic ink (E-ink) or other type of electrophoretic display element. In another example, the non-emissive display element may be a liquid crystal display (LCD) without backlight, although other types of non-emissive display elements may also be employed.

The non-emissive display element may be arranged as a circle or other shape depending on the overall appearance of the smartwatch, such as shown in FIG. 2. Depending on the size and shape of the display, different resolutions and colors or greyscales may be employed. For instance, the resolution may be 180×180, 240×240, 960×540, 1448×1072, 1200×1600, or higher or lower. The bit depth may be, e.g., 1-bit, 2-bit, 4-bit or more. If greyscale is used instead of a color palette, the greyscale may be, e.g., black and white, 4 greyscales, 16 greyscales or more or less.

Figure 4:
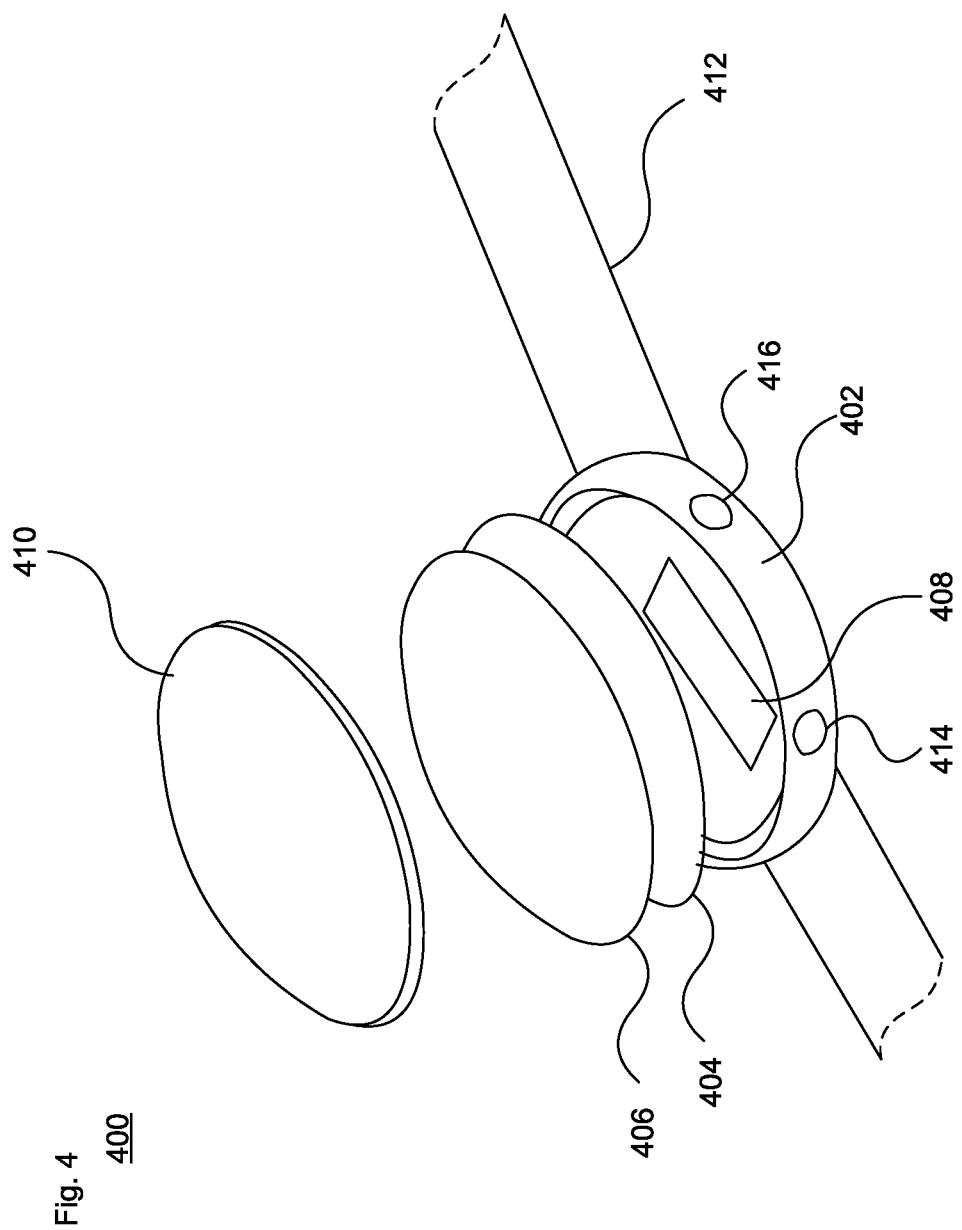
FIG. 4 illustrates a component view of a smartwatch in accordance with aspects of the disclosure.

FIG. 4 is an exploded view of an example smartwatch 400 in accordance with aspects of the disclosure. Housing 402 is arranged to receive a non-emissive display element 404 and an emissive display element 406, as well as a printed circuit board (PCB) 408, on which may reside the processors and other components of the smartwatch described above with regard to FIG. 1. A cover 410, such as a transparent glass or plastic cover 410, is arranged to overly the emissive and non-emissive display elements, and these components may form graphical display 128 of FIG. 1. A band 412 is affixed to the housing 402. And as shown, one or more mechanical actuators, e.g., tactile buttons 414 and 416, may be disposed on the housing 402 and operatively coupled to the PCB 414.

According to the arrangement illustrated in FIG. 4, the emissive display element 406 is disposed between the non-emissive display element 404 and the cover 410. In one alternative, at least one small emissive display elements may be arranged inset or next to the non-emissive display element, e.g., in a co-planar configuration.

The non-emissive display element can provide, e.g., textual, slow-changing or stationary content for the user interface. The emissive display element may be used to present content that has a faster update rate (e.g., inputted text) or content that requires a faster refresh rate (e.g., animations). The emissive display element may also be employed to highlighted content generated by the non-emissive display element, such as by increasing the brightness of an area of the graphical display, by creating steerable illumination, etc. These are merely examples. The processor(s) may select slowly changing or static content to be rendered by the emissive display, and/or may select faster changing content or content with a faster refresh rate to be rendered by the non-emissive display. This may be done as the processor(s) evaluate aspects including power consumption and visual quality, which includes factors such as brightness, color, texture, artifacts and emission.

In another alternative, multiple emissive display elements may be provided in a layered configuration. For instance, since monochromatic transparent OLEDs may be cheaper, thinner and/or more power efficient than a single multicolor TOLED, the system may include two monochromatic TOLEDs, e.g., with green and yellow colors, respectively. More than two monochromatic TOLEDs could also be provided. These layered TOLEDs can be turned on or off, either entirely or on a region or pixel-by-pixel basis, to provide desired effects or other content visualizations with the graphical display.

In yet another alternative, there may be multiple layers of non-emissive display elements. By way of example, the non-emissive display element 404 may comprise at least two layers, e.g., an electrophoretic display element and an LCD element without backlight. Here, the emissive display element 406, e.g., a multicolor TOLED, can be disposed between or on top of the non-emissive display layers (e.g., between the non-emissive display layers and the cover). In this case, the LCD may have a lower resolution than the electrophoretic display element, but can be used to selectively block certain areas or specific pixels of the electrophoretic display element, in order to achieve a particular visualization with the graphical display.

EXAMPLE SCENARIOS

The system uses the emissive and non-emissive display elements in a concurrent and complementary manner, under the control of one or more processors, such that content items or other features of the graphical display are aligned across the different display layers. This enhances the user interface by leveraging the advantages of each display layer. For instance, certain content may be static or slowly changing. This type of content is more efficiently generated for display by the non-emissive display layer(s). In contrast, other content or enhancements to the static content may be fast changing or best presented with vibrant colors. This type of content lends itself to generation by the emissive display element(s). Various examples and scenarios are discussed further below.

Transitioning Content Elements From Emissive Display to Non-Emissive Display

As noted above, different types of emissive displays can be well-suited to generate fast-changing content. Accordingly, in one type of scenario content that is new or undergoing modification is initially generated by an emissive display element, e.g., an emissive display layer disposed between a non-emissive display layer and the cover. An example of this type of scenario is presented in FIGS. 5A-C. FIG. 5A illustrates graphical display 500, in which an email message or other notification is presented to the wearer of the smartwatch. Here, the notification or a portion of it is shown along the upper half of the graphical display, and options for handling the notification are presented along the lower half. For instance, the wearer may elect to archive the message, delete it or reply to it. A representation of a minute hand, an arrow or other indicator may point or otherwise identify one or more of the user-selectable options.

In this example, certain content is relatively static while other content may change. For instance, the notification may be received by the smartwatch from an external device, or may be a reminder for an app executed by the processor(s). Here, the initial generation (rendering) of the notification and the indicator is performed by emissive display element 406, while generation of the user options and circular graphical element is performed by the non-emissive display element 404, as shown in separated layer view 510 of FIG. 5B. Then, as shown in separated layer view 520 of FIG. 5C, after a period of time has elapsed, the notification is no longer generated by the emissive display element. Instead, the non-emissive display element is instructed by the processor(s) to generate the notification in addition to the other content. The emissive display element continues to generate the indicator, since that content item may need to be quickly modified, e.g., in response to user input.

The duration of time that the emissive display element presents selected content before that content is generated by the non-emissive display element may vary according to one or more factors. These may include, predefined timing, the type of content, the amount of ambient light in the environment, the amount of power available to run the emissive display element, received signals and other factors. For instance, the time period may be on the order of 30 seconds, between 5-45 seconds, less than 60 seconds, or at least 2 seconds.

Other examples for when content elements may be transitioned from the emissive display to the non-emissive display include the following. When the user is setting the time on the smartwatch, the digits that are being changed are rendered with the emissive display element while other information is rendered with the non-emissive display element. During text entry or speech input, which requires fast update rates, the emissive display element renders the changing input. After the initial input, for instance after 5-15 seconds, the previously entered content then becomes "permanently" presented using the non-emissive display element, such as for the duration of an action, until an app is closed, until the smartwatch is powered off, until the graphical display enters a power saving mode with reduced illumination or no content presentation, etc. Here, the emissive display element provides a dual purpose as it implicitly indicates that it is receiving input.

Rapidly Changing Content

In other scenarios, the processor(s) may determine that certain content will remain static (e.g., for at least a certain period of time) while other content may change (e.g., in response to received signals or sensor input, or anticipating an input signal from the user). In these situations, the processor(s) can instruct the non-emissive display element to render the static content while instructing the emissive display element to render dynamic content so long as the visuals are presented on the graphical interface.

As part of the processor's determination, the update speed of the non-emissive display element can be one factor to evaluate, either alone or in conjunction with power consumption and visual quality. Different types of non-emissive display devices may have different update speeds and power requirements. For instance, an LCD may update faster than an electrophoretic display. Fast updates can consume more power. In some instances, such as with an electrophoretic display, rapid changes can potentially leave some visual artifacts on the graphical display. Slow updates may be more efficient and can make very clean image transitions. These criteria can be evaluated by the processor as part of the decision process on whether to have the non-emissive display element render certain content rather than the emissive display element. In contrast, for certain information such as animations or content that require high-frame updates above a given threshold (e.g., 1-10 Hz update rates), the processor may select the emissive display element to avoid artifacts, even if that causes a larger consumption of power.

Figure 6C:
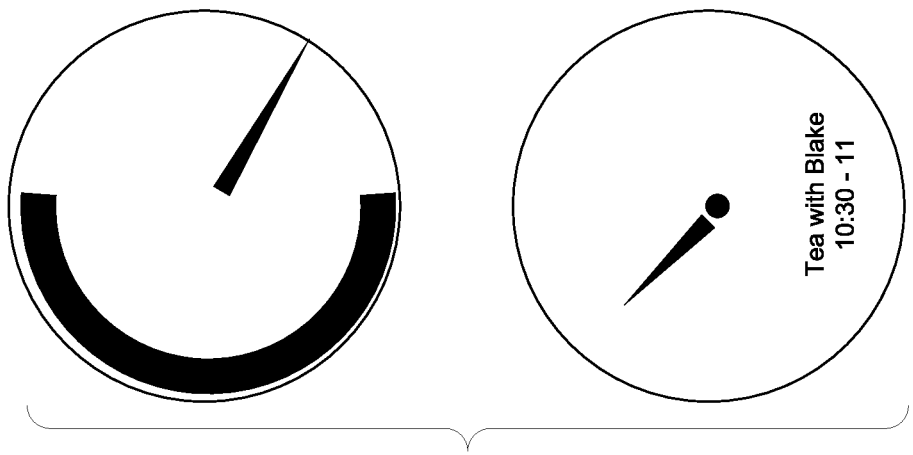
FIGS. 6A-6C illustrate an example of symbiotic display in accordance with aspects of the disclosure.
Figure 6B:
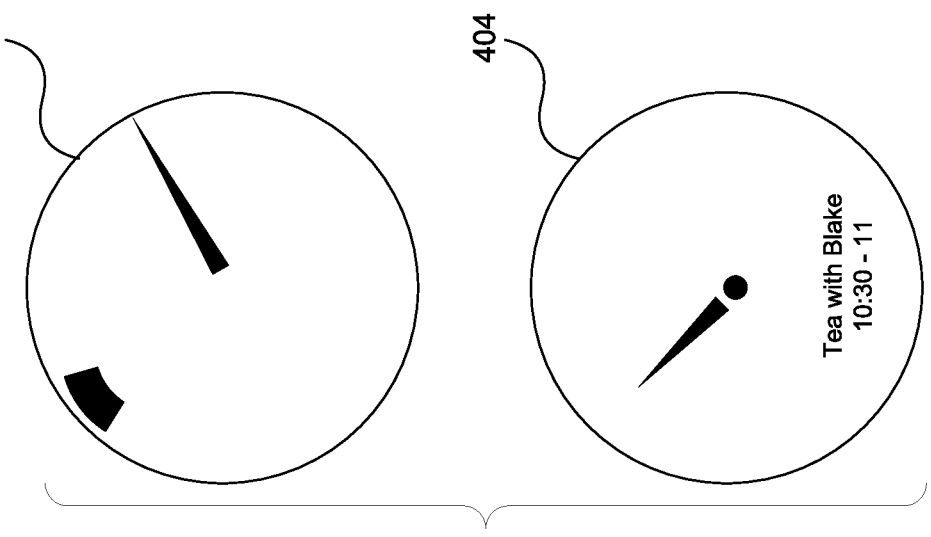
Figure 6A:
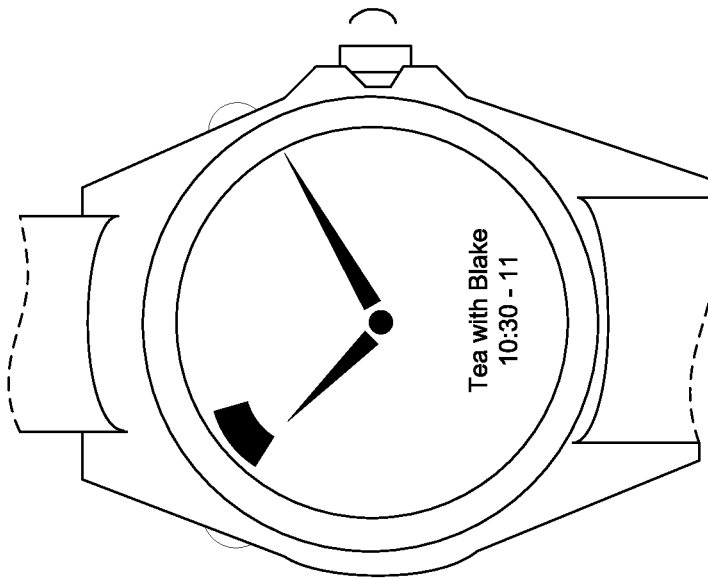

FIGS. 6A-C illustrate one example for presenting rapidly changing content. Here, FIG. 6A illustrates graphical display 600, in which a reminder or other notification is provided to the wearer. As shown in FIG. 6A, a notification or other information describing the reminder is presented on the lower half of the graphical display. Other elements, such as simulated watch hands and a thick angular section representing the duration of an event are presented in the upper half of the graphical display. It should be understood that such elements can be presented anywhere along the graphical display.

Generation of the dynamic parts of the notification is performed by emissive display element 406, while generation of the static parts is performed by the non-emissive display element 404, as shown in separated layer view 610 of FIG. 6B. In this example, the dynamic parts of the notification may be subject to modification by the wearer or change according to other criteria. For instance, the user may modify the duration of a meeting (e.g., via a tactile adjustment using one or more fingers, via a voice command, etc.), while the simulated minute hand moves according to the time. Thus, as shown in separated layer view 620 FIG. 6C, this type of content continues to be rendered by the emissive display element while the other content is rendered by the non-emissive display element.

Figure 7B:
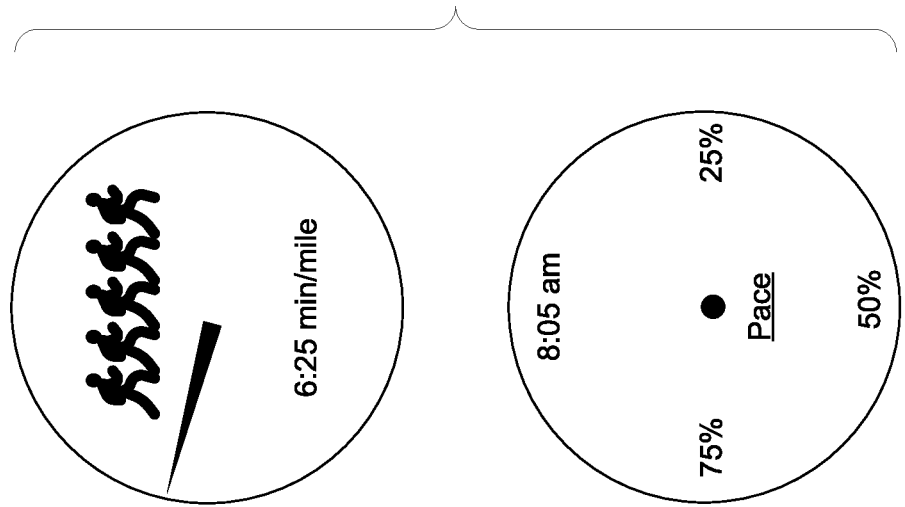
FIG. 7A-7B illustrate an example of displaying fast-changing content in accordance with aspects of the disclosure.
Figure 7A:
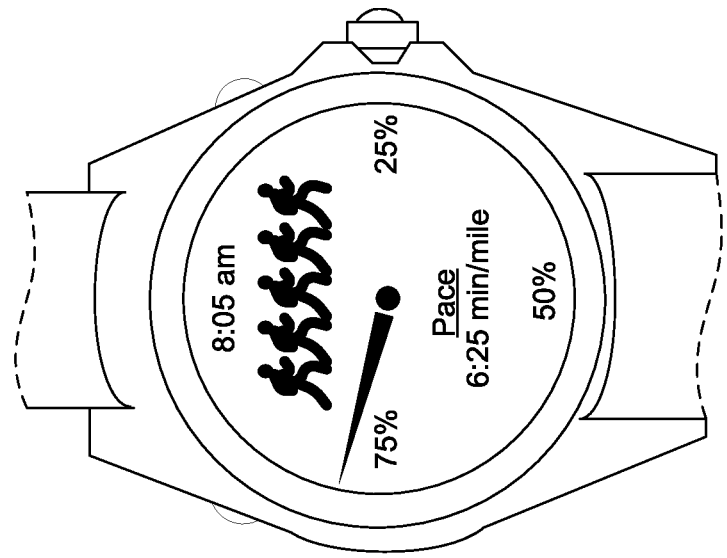

FIGS. 7A-B illustrate another example. In this case, FIG. 7A illustrates graphical display 700 showing an exercise app. Here, certain content is dynamic, such as the pace, which can be illustrated by a dial pointing to a percentage value and/or a set of icons representing the amount of activity, is rendered by the emissive display element 406 as shown in separated view 710 of FIG. 7B. Other items, e.g., exercise time, distance, pulse rate, etc., may also be rendered by the emissive display element. In contrast generation of the static parts, such as time of day and preset percentages, is performed by the non-emissive display element 404.

According to a further example, to increase the sense of responsiveness in menus and navigation for the user interface, a cursor can be rendered with fast updates on the emissive display element, whereas the non-emissive display element would present mostly static information until a selection is made.

Augmenting Content

Other scenarios in which the graphical display system divides the rendering between the emissive and non-emissive displays involve highlighting, emphasizing or otherwise augmenting content. For instance, an emissive display element can be used to indicate when numbers are approaching undesirable limits, such as an elevated heart rate, or speed exceeding a particular threshold. By gradually increasing the brightness of the emissive display element that is on top of the non-emissive display element, the system is able to highlight the relevant content and the user can get a sense of these changes as they slowly escalate. This approach also has the benefit of being visible in the periphery, as well as giving the user an opportunity to stay close to the limit (slight increase in brightness) without exceeding it (strong light).

Figure 8C:
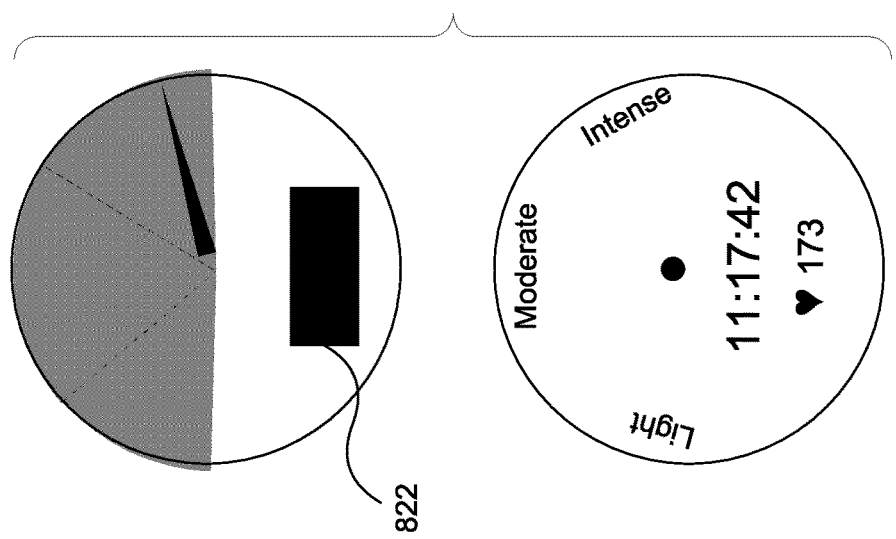
FIGS. 8A-8C illustrates an example of content highlighting in accordance with aspects of the disclosure.
Figure 8B:
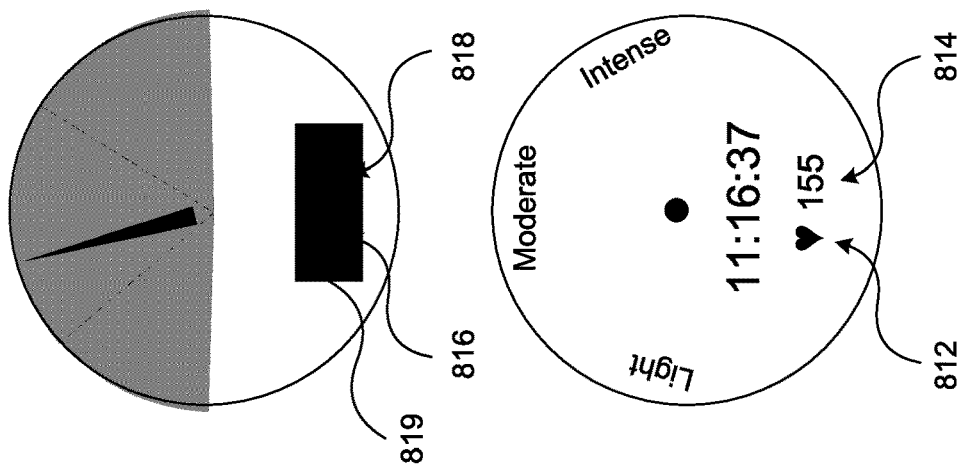
Figure 8A:
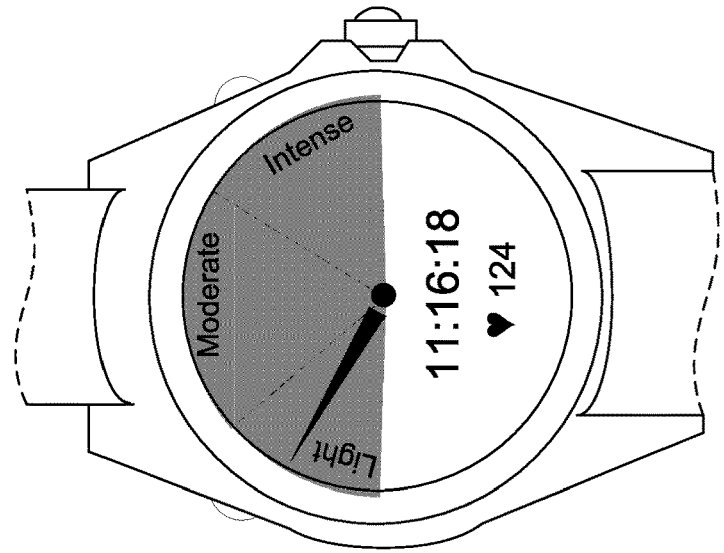

FIGS. 8A-C illustrate one example scenario. FIG. 8A includes graphical display 800 showing an exercise app. Here, the graphical display includes a first region (e.g., along the upper half) that indicates whether the exercise is light, moderate or intense. This section may be color-coded and/or include icons, graphics or other indicia to show the different workout intensities. The graphical display also includes a second region (e.g., along the lower half) that provides time and heartrate information. Other information may also be included depending on user preferences, types of information, available display area and other factors.

In this example, as shown by 810 of FIG. 8B, certain features are rendered by the emissive display element. These features include colored (or greyscale) sections for the first region to delineate the workout intensity ranges. They also include fast changing content such as an arrow, line or other graphic to show where the workout intensity falls along the first region. Static text and slowly changing content is rendered using the non-emissive display element.

As shown in this configuration, the non-emissive display element generates a heart symbol 812 and a heartrate value 814 along with the current time. The non-emissive display element also generates text explaining the light, moderate and intense exercise levels, e.g., to complement the color scheme generated by the emissive display element. Here, the emissive display element may also generate a graphic 816 and value 818 that match those generated by the non-emissive display element. This can help accentuate these particular pieces of contents. In addition or in lieu of this, the emissive display element can also illuminate or highlight a region 819 around selected content items generated by the non-emissive display element. In this example, region 819 is a small rectangular area used to highlight the heart symbol and the heartrate value.

The graphical display layers 820 of FIG. 8C further illustrate this. Here, the region 819 of FIG. 8B may be further accentuated by highlighting, shading, coloring, and/or placing a border 822 around the content of interest. The system may do this to indicate an elevated heartrate in this example. Thus, it can be seen that the system is configured to use a selected portion of the emissive display element to augment (e.g., highlight) a given item of content that is being rendered by the non-emissive display element. As noted above, such augmentation can be achieved in multiple ways. This can include replicating the given content item in the emissive display layer, which could be of the same or similar size and/or shape to make it appear bolded, slightly offset by a pixel or more to give a 3D visual effect, etc. Augmenting can also be done by changing the illumination and/or color of the emissive display layer overlaying the given content item.

In a further example of this approach, at night or in low-light environments, the emissive display layer can be used to highlight or otherwise augment specific features with subtle illumination, for instance to provide a minimum amount of light to enable the user to read a message or discern the location of content items (e.g., watch hands) presented by the non-emissive display layer.

The features and approaches from each of these scenarios and examples may be applied to any of the other scenarios and examples.

FIG. 9 illustrates a flow diagram 900 of a method of operating a symbiotic graphical display device as discussed herein. At block 902, one or more processors of the device determine at least one of an update rate or a refresh rate for each content item to be presented on the graphical display. For instance, the determination may include whether a given item is static, slowly changing (e.g., over tens of seconds, minutes or hours), fast changing (e.g., within 1-10 seconds), flashing (e.g., changing one or more times a second) or require a specific refresh rate. As noted above, other aspects that can be evaluated by the processor(s) include power consumption and visual quality factors such as brightness, color, texture, artifacts and emission.

At block 904, for a first set of one or more content items that each has a respective refresh rate or update rate above a threshold value, the one or more processors control an emissive display element (or multiple such elements) to render the first set of content items. Thus, fast changing, flashing or non-static content items are generated for presentation using the emissive display element.

At block 906, for a second set of one or more content items that each has a respective refresh rate or update rate below a threshold value, the one or more processors control a non-emissive display element (or multiple such elements) to render the second set of content items. Thus, static or slowly changing items are generated for presentation using the non-emissive display element.

Upon generation, per block 908 the rendered (generated) first and second sets of content items are presented concurrently via the symbiotic graphical display device. These operations may occur concurrently (e.g., in parallel), in series, or in a different order. The threshold values associated with the operations for the emissive and non-emissive display elements may be the same, or may be different.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An electronic display device configured to present content to a user, the device comprising:
   a first display configured to render a first set of content elements in a first region;
   a second display different and discrete from the first display, the second display configured to render a second set of content elements in a second region in coordination with the rendering of the first content elements by the first display, such that the first and second content elements are displayed concurrently in the first and second regions, respectively; and
   a user interface subsystem configured to receive input through at least one of the first or second displays.

2. The electronic display device of claim 1, wherein the first and second display are arranged in a co-planar configuration.

3. The electronic display device of claim 1, wherein the second display is arranged inset of the first display.

4. The electronic display device of claim 1, wherein the first display has a different size than the second display.

5. The electronic display device of claim 1, wherein the first display has a different shape than the second display.

6. The electronic display device of claim 1, wherein the first content elements change less frequently than the second content elements.

7. The electronic display device of claim 1, wherein the first display is configured to augment the second content rendered by the second display.

8. The electronic display device of claim 7, wherein the augmenting comprises increasing a brightness, coloring, or shading a portion of the second display.

9. The electronic display device of claim 1, wherein the input received by the user interface subsystem changes the second content rendered by the second display.

10. The electronic display device of claim 1, wherein the first content elements are static and the second content elements are dynamic.

11. The electronic display device of claim 1, wherein the electronic display device is a smartwatch.

12. The electronic display device of claim 1, wherein the first and second display are arranged within a circular housing having a transparent cover overlaid over both the first and second display.

13. A smartwatch, comprising:
   a housing;
   a first display configured to render a first set of content elements in a first region;
   a second display different and discrete from the first display, the second display configured to render a second set of content elements in a second region in coordination with the rendering of the first content elements by the first display, such that the first and second content elements are displayed concurrently in the first and second regions, respectively; and
   a user interface subsystem configured to receive input through at least one of the first or second display.

14. The smartwatch of claim 13, wherein the first and second display are arranged in a co-planar configuration.

15. The smartwatch of claim 13, wherein the second display is arranged inset of the first display.

16. The smartwatch of claim 13, wherein the first display has a different size than the second display.

17. The smartwatch of claim 13, wherein the first display has a different shape than the second display.

18. The smartwatch of claim 13, wherein the first content elements change less frequently than the second content elements.

19. The smartwatch of claim 13, wherein the first display is configured to augment the second content rendered by the second display.

20. The smartwatch of claim 19, wherein the augmenting comprises increasing a brightness, coloring, or shading a portion of the second display.

* * * * *